United States Patent [19]

Quist

[11] 4,350,185
[45] Sep. 21, 1982

[54] LIQUID REPLENISHMENT SYSTEM FOR ACCUMULATOR CELLS

[75] Inventor: Kaj Quist, Nol, Sweden

[73] Assignee: AB Tudor, Nol, Sweden

[21] Appl. No.: 216,912

[22] Filed: Dec. 16, 1980

[30] Foreign Application Priority Data

Dec. 20, 1979 [SE] Sweden .............................. 7910526

[51] Int. Cl.³ ........................... B65B 3/04; B67C 3/16
[52] U.S. Cl. ..................................... 141/35; 137/205; 137/260; 141/59; 141/115
[58] Field of Search .................... 137/205, 260; 141/7, 141/35, 36, 59, 198, 392, 115

[56] References Cited

U.S. PATENT DOCUMENTS 1,354,800 10/1920 Butler .................................. 137/260
2,623,513 12/1952 Robertson ........................... 141/598

FOREIGN PATENT DOCUMENTS 2854038 5/1979 Fed. Rep. of Germany.

Primary Examiner—Frederick R. Schmidt
Attorney, Agent, or Firm—Burns, Doane, Swecker & Mathis

[57] ABSTRACT

In a central liquid replenishment system for accumulator cells (1,2) each cell is connected to an inflow conduit (9) for battery liquid and comprises means (7,8,10) permitting the battery liquid to the flow past the cell when the electrolyte level in the cell is normal. The inflow conduit communicates with a central supply (19) for battery liquid and with a suction device generating an underpressure in the system, causing battery liquid to flow to the cells. The replenishment container (16) for battery liquid is arranged at a level such that the liquid level in the container is substantially the same as in the cells. The pressure conditions in the accumulator, and thus its replenishment characteristics will therefore be independent of the relative positions of the central supply and the accumulator.

6 Claims, 1 Drawing Figure

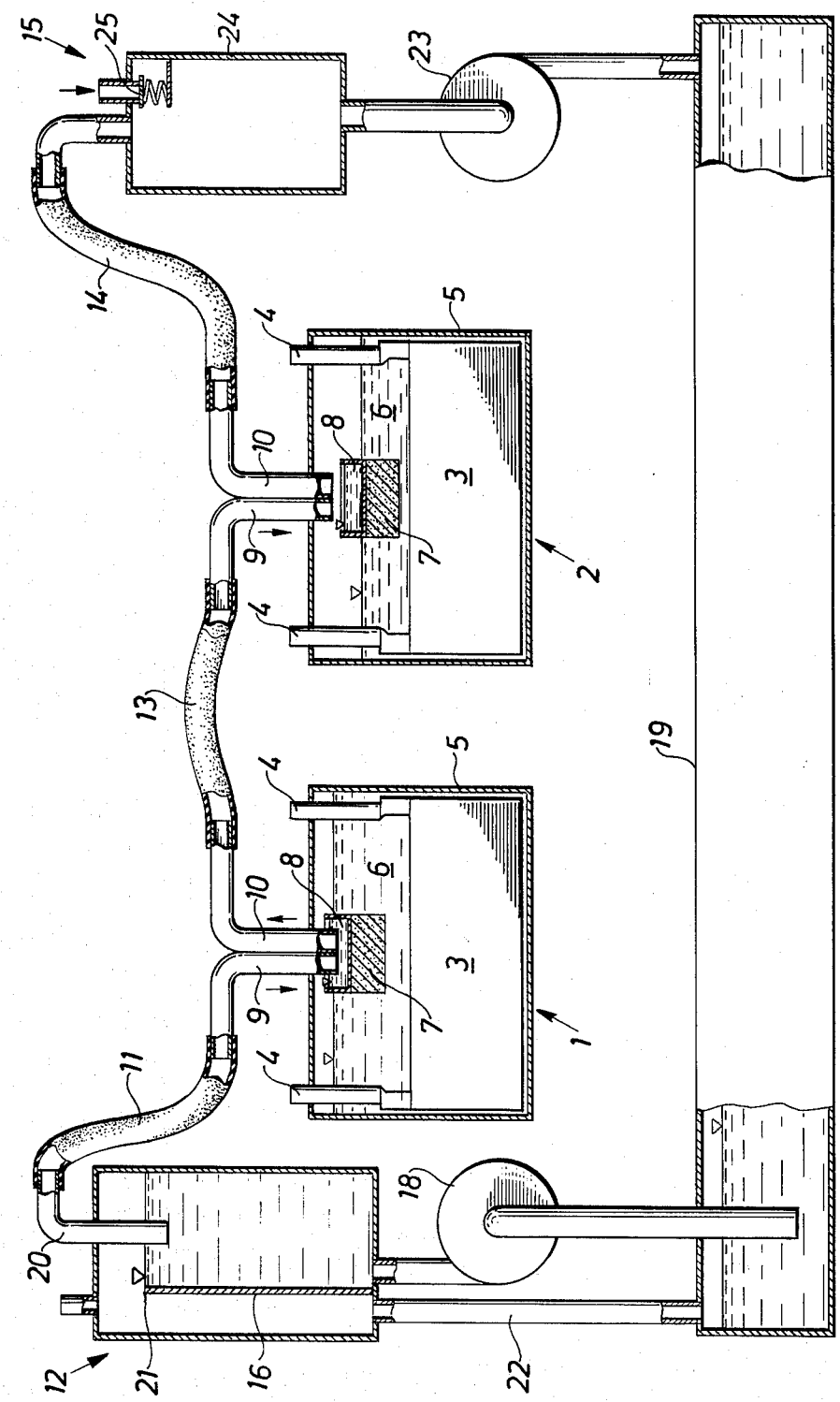

LIQUID REPLENISHMENT SYSTEM FOR ACCUMULATOR CELLS

The present invention relates to a liquid replenishment system for accumulator cells in which each cell is adapted for connection to a liquid inflow conduit and comprises means permitting the liquid to flow past the cell when the liquid level in the cell is normal, the inflow conduit being adapted for communication with a central supply of battery liquid and with a suction device generating an underpressure in the system, thereby causing battery liquid to be transported to the cells.

A liquid replenishment system of the kind described above is previously known, for instance from DE-OS 2 854 038.7, disclosing means for generating an underpressure in the system and means permitting the battery liquid to be drawn away from a central supply and into or past the cells by means of a float which floats on the electrolyte in each cell and which is provided with a container in the form of a bowl, participating in the movements of the float when the electrolyte level in the cell varies. When the electrolyte level is normal the bowl is filled with battery liquid and arranged such that the inlet end of the outflow conduit is below the liquid surface in the bowl so that battery liquid supplied to the bowl through the inlet conduit is simultaneously drawn away from the bowl through the outflow conduit, liquid thus not being supplied to the electrolyte in the cell. On the other hand, if the electrolyte level is below normal, the inlet end of the outflow conduit is above the liquid surface in the bowl, so that the liquid supplied through the inflow conduit will flow into the bowl, and down into the electrolyte. The suction device which communicates with the cell through the outflow conduit generates the underpressure in the cell causing the battery liquid to be drawn from the central supply and into the accumulator cell. When the electrolyte level becomes normal once again, the inlet end of the outflow conduit will also be below the liquid surface in the bowl, and the battery liquid will consequently flow down into the bowl through the inlet conduit, to be led away therefrom through the outflow conduit at the same rate.

Systems known hitherto, operating with underpressure to deliver liquid to the accumulator cells have been found to have certain drawbacks, depending on the fact that a relatively large underpressure must be generated to draw battery liquid away from the central supply and distribute it to the cells. This underpressure can cause identation of the relatively soft walls of the cell containers, thereby decreasing the inner volume thereof, and causing rise of the electrolyte level. Moreover, the system will be extremely sensitive to leakages, e.g. at bushings for poles and conduits connected to the cell.

One object of the present invention is to provide a system wherein the underpressure has been restricted to a level which is independent of the position of the central liquid supply relative to the battery cells, whereby the above-mentioned drawbacks have been eliminated.

This object is realized in a system which is substantially characterized in that the central liquid supply is adapted for communicating with a replenishment container from which battery liquid is supplied to the cells, and which is arranged at a height such that the level of the battery liquid will be substantially that of the electrolyte in the cells, the suction device being provided with means for restricting the underpressure.

BRIEF DESCRIPTION OF DRAWING

One embodiment of the invention is described in detail in the following, reference being made to the accompanying drawing showing a replenishment system in accordance with the invention.

The replenishment system shown in the FIGURE is connected to two accumulator cells 1 and 2. Each of these cells includes electrodes 3 which are connected to pole posts 4 passing gas-tight through a cell container 5 which is filled with electrolyte 6 to a given level. A float 7 floats on the electrolyte and on the upper side of the float there is a bowl-like container 8 filled with battery liquid. The bowl 8 and the float 7 are located directly under the ends of two conduits for battery liquid, one being an inflow conduit 9 and the other an outflow conduit 10, both being taken gas-tight through the cover of the container. The inflow conduit 9 of one cell 1 is connected to a liquid replenishment device 12 via a hose 11, and the outflow conduit 10 is connected in series to the inflow conduit 9 of the second cell 2 via another hose 13. Through a hose 14 the outflow conduit 10 from the second cell is connected to a suction device 15 generating an underpressure or negative pressure in the system for the distribution of battery liquid to the two cells 1 and 2 shown in the FIGURE. In the first cell 1 the electrolyte level 6 is normal, signifying that battery liquid will be drawn from the replenishment device 12 and through the inflow conduit 9 down into the bowl 8 of the float 7, from which it will be sucked away at the same rate through the outflow conduit 10 and further to the inlet conduit 9 of the second cell 2. As shown in the FIGURE, the electrolyte level in the second cell is below normal, the float 7 and its bowl 8 thus also being below their normal level. The ends of the conduits will then be above the liquid level of the bowl 8, causing the interior of the cell to be in communication with the suction device 15 through the outflow conduit 10. The battery liquid flowing from the replenishment device 12 via the float bowl in the first accumulator 1 will consequently be caused to flow to the second cell via the inflow conduit of the latter, and this will continue until the liquid level of the electrolyte has raised the float so that the liquid level in the bowl 8 is slightly above the ends of the inflow and outflow conduits. When this occurs the liquid flowing from the inflow conduit into the bowl will be drawn off from the bowl through the outflow conduit 10 simultaneously and at the same rate.

In accordance with the invention, the central supply communicates in series with a replenishment container 16 for battery liquid, and the liquid level in this container must be on substantially the same level as the electrolyte level in the accumulator cells, preferably somewhat below the electrolyte level. A pump 18 transports liquid from a central liquid container 19 to the replenishment container 16, at least at the same rate as the maximum rate that liquid can be transported to the central replenishment system by the suction device 15. Liquid is sucked away from the replenishment container 16 through a conduit 20, the end of which is just below the liquid level of the container, this level being kept constant by means of an overflow device which is here a simple threshold 21. The liquid flowing over the threshold 21 will be returned to the central liquid container 19 through a transfer pipe 22.

It has been found that an underpressure of about 40–50 millibar is sufficient to distribute battery liquid to a great number of cells, e.g. an accumulator with 60 cells. To maintain a suitable underpressure in the system it is suitable to use a vacuum pump 23 which can generate much lower pressures than mentioned above if the inflow is restricted. A pressure control chamber 24 is therefore connected in series between the suction side of the pump and the replenishment system, in order to restrict the underpressure in the battery cells to an acceptable value. This will make it possible to utilize the pump at a maximum during the first stage of the replenishment when the flow resistance is small. When the resistance increases and the pressure falls below a certain set value, a control valve 25 will be opened, and air will be permitted to flow into the chamber, thus maintaining the pressure therein substantially constant and above a certain set limiting value. In a suitable embodiment of the system in accordance with the invention the replenishment container 16 and the pressure control chamber 24 are built together to form a unit with connecting means for accumulators and pump equipment.

I claim:

1. A liquid replenishment system for a plurality of accumulator cells comprising a central supply of battery liquid and a suction device for generating a negative pressure, said accumulator cells being disposed above said central supply and interconnected in series between the central supply and the suction device by means of air-tight inflow and outflow conduits for battery liquid in each cell, whereby the liquid is induced to flow into each of the cells by the negative pressure and means in each cell for permitting the liquid to flow into and out from the cell when the liquid level therein is normal, the improvement wherein a replenishment container for battery liquid is connected in series between the central supply and the cells at a height such that the liquid level in the container is substantially above that of said central supply and generally the same as that of the electrolyte liquid in the cells, means separate from said suction device for inducing a flow of electrolyte from said central supply to said replenishment chamber and means for limiting the negative pressure in the system.

2. A system according to claim 1, including overflow means in said replenishment container for maintaining the liquid in said replenishment container at a substantially constant level.

3. A system according to claim 1, wherein said flow inducing means supplies a flow of battery liquid to said replenishment container continuously at a rate at least as great as the rate at which liquid is supplied to the cells.

4. A system according to claim 1, wherein a pressure chamber is connected in series between the suction device and the cells, said chamber including said means for limiting the negative pressure in the system.

5. A system according to claim 4, wherein said means for limiting the negative pressure comprises a pressure-responsive control valve capable of communicating said pressure chamber with the ambient surroundings.

6. A system according to claim 1, wherein said replenishment container is arranged at a height such that the liquid level in the container is somewhat below that of the electrolyte in said cells.

* * * * *